(12) United States Patent
Chung et al.

(10) Patent No.: US 12,523,763 B2
(45) Date of Patent: Jan. 13, 2026

(54) MULTIMODE RADAR DEVICE

(71) Applicant: CUBTEK INC., Hsinchu County (TW)

(72) Inventors: Shyh-Jong Chung, Hsinchu County (TW); Ching-Han Tsai, Hsinchu County (TW); Yu-Wang Hu, Hsinchu County (TW); Hong-Lun Chen, Hsinchu County (TW); Hsien-Min Chen, Hsinchu County (TW); Hsiao-Ning Wang, Hsinchu County (TW)

(73) Assignee: CUBTEK INC., Zhubei (TW)

( * ) Notice: Subject to any disclaimer, the term of this patent is extended or adjusted under 35 U.S.C. 154(b) by 527 days.

(21) Appl. No.: 17/569,840

(22) Filed: Jan. 6, 2022

(65) Prior Publication Data

US 2022/0252720 A1     Aug. 11, 2022

(30) Foreign Application Priority Data

Feb. 5, 2021    (TW) .................................. 110104555

(51) Int. Cl.
    *G01S 13/931*      (2020.01)
    *G01S 7/03*         (2006.01)
    *G01S 13/52*       (2006.01)

(52) U.S. Cl.
    CPC .............. *G01S 13/931* (2013.01); *G01S 7/03* (2013.01); *G01S 13/52* (2013.01); *G01S 2013/932* (2020.01); *G01S 2013/93272* (2020.01)

(58) Field of Classification Search
    CPC .......... G01S 13/931; G01S 7/03; G01S 13/52; G01S 2013/932; G01S 2013/93272;
(Continued)

(56) References Cited

U.S. PATENT DOCUMENTS

| | | | | |
|---|---|---|---|---|
| 5,087,918 A | * | 2/1992 | May .................... | G01S 13/931 342/70 |
| 2005/0128132 A1 | * | 6/2005 | Ziller ................... | G01S 7/034 342/175 |

(Continued)

FOREIGN PATENT DOCUMENTS

| | | | | |
|---|---|---|---|---|
| CN | 112764036 A | * | 5/2021 | .......... G01S 13/931 |
| DE | 10 2007 035 219 A1 | | 1/2009 | |

(Continued)

*Primary Examiner* — Vladimir Magloire
*Assistant Examiner* — Remash R Guyah
(74) *Attorney, Agent, or Firm* — Birch, Stewart, Kolasch & Birch, LLP (57) ABSTRACT

A multimode radar device includes a central processing module, and an antenna module disposed in a middle area of the rear end of a vehicle and electrically connected with the central processing module. The central processing module has a motion determination switch unit, which has a low distance resolution mode and a high distance resolution mode. The motion determination switch unit detects the moving direction of the vehicle. When the vehicle moves forward, the antenna module operates in the low distance resolution mode. When the vehicle reverses, the antenna module operates in the high distance resolution mode. The present invention applies different distance-based resolution modes for blind spot detection and reverse radar detection, so as to fulfill the purpose and demand in different moving motion.

15 Claims, 10 Drawing Sheets

(58) Field of Classification Search
CPC .................. G01S 13/723; G01S 13/62; G01S
2013/9315; G01S 2013/9317; G01S 7/02;
G01S 13/00; G01S 13/86; G01S 13/865;
G01S 13/87; G01S 13/93; G01S 13/72;
G01S 7/00; G01S 7/35; G01S 7/292;
B60R 1/00; B60R 21/00; B60W 30/06
USPC ...... 342/70, 27, 52, 118, 175; 340/435, 903;
701/301; 180/167
See application file for complete search history.

(56) References Cited

U.S. PATENT DOCUMENTS

2006/0128132 A1* 6/2006 Sinha ................ C23C 16/45529
257/E21.171
2022/0065991 A1* 3/2022 Zhang ................... G01S 13/931

FOREIGN PATENT DOCUMENTS

| DE | 10 2015 012 812 A1 | 4/2017 | |
|----|--------------------|--------|---|
| DE | 10 2018 118 238 A1 | 1/2020 | |
| EP | 2244104 A2 * | 10/2010 | ........... G01S 13/723 |
| JP | 2007-22280 A | 2/2007 | |
| JP | 2007022280 A * | 2/2007 | |
| JP | 2010-127835 A | 6/2010 | |
| JP | 2010-175555 A | 8/2010 | |

\* cited by examiner

MULTIMODE RADAR DEVICE

BACKGROUND OF THE INVENTION

1. Field of the Invention

The present invention relates to multimode radar devices, and more particularly, to a multimode radar device capable of detecting the moving direction of a vehicle and automatically switching low and high distance resolution modes.

2. Description of the Related Art

Figure 1:
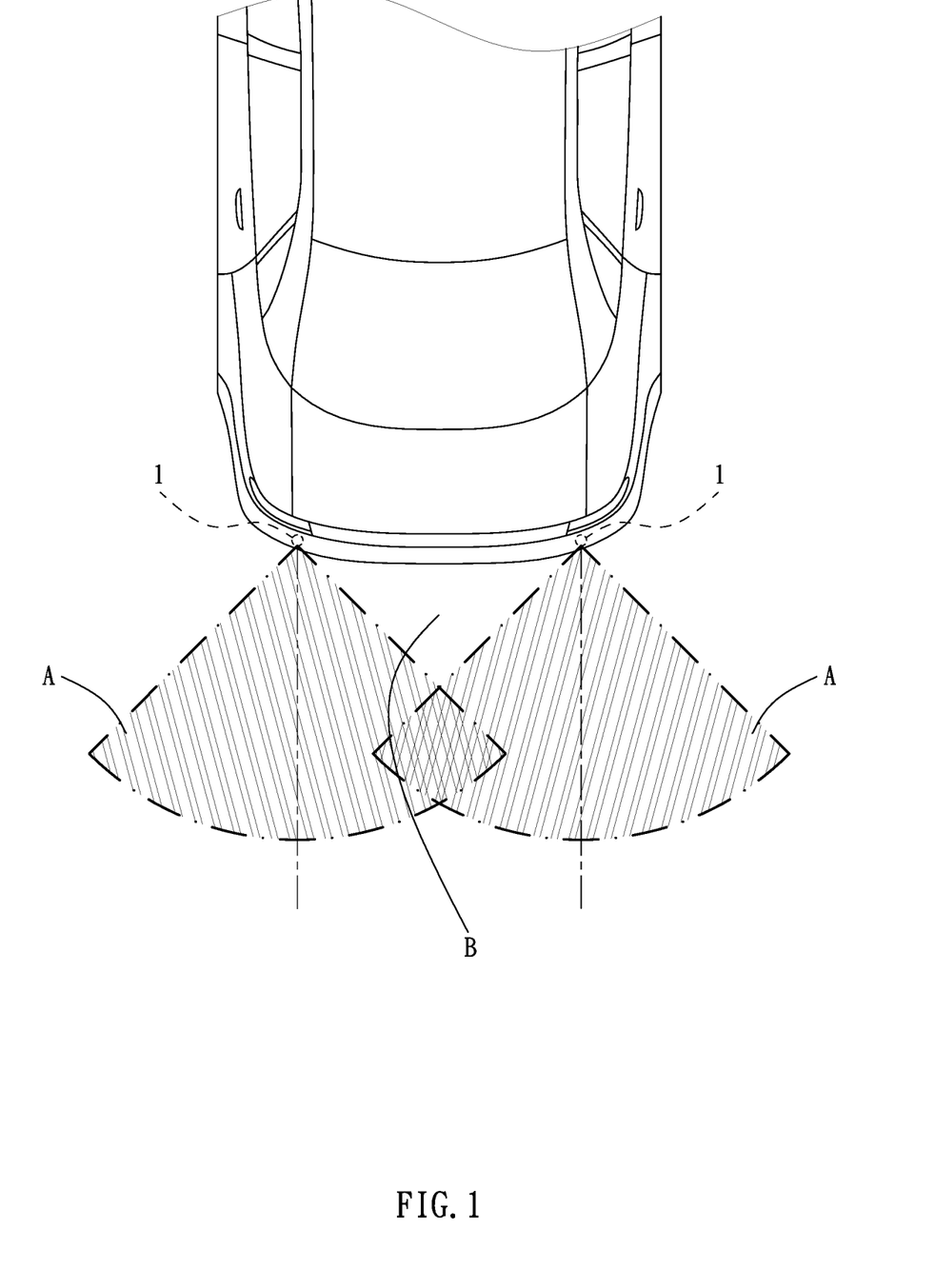
FIG. 1 is a schematic view illustrating the detection area of a conventional antenna module.

Reverse radars and blind spot detections (BSD) are one of the most common safety assistance devices in the market. Therein, at least an antenna module 1 sends out at least a transmission signal. When the transmission signal meets an object, a reflection signal is reflected to the antenna module 1, so as to detect the distance or velocity of the vehicle moving toward/away from the object. Then, a sound or light message is applied for reminding the driver of the vehicle for preventing collision accident. Referring to FIG. 1, a conventional antenna module 1 is usually installed on the rear bumper of the vehicle for facilitating a rear side warning function. Regarding the conventional antenna module 1, the detection range is often presented as a sector area A within an angle range of 70-85 degrees. Therefore, two antenna modules 1 are usually needed on the left and the right sides of the bumper, providing a larger detection area, thereby preventing the issue of an insufficient covering range which affects the warning effect.

However, in the conventional art, even if the detection area is formed by use of two antenna modules 1, there is still a detection blind area B existing and not covered between the two sector-shaped areas A (especially in the middle of the two antenna modules 1). Therefore, for currently available reverse radar products, there are still collision accidents in which an elongate rod or railing being not detected in the rear of the vehicle during reversing. Although the issue can be resolved by applying the antenna modules having a larger detection area for reducing the detection blind area, the cost of the product accordingly rises.

SUMMARY OF THE INVENTION

To improve the issues above, the present invention discloses a multimode radar device capable of detecting the moving direction and status of the vehicle and automatically switching high and low resolution modes, wherein only a signal antenna module is needed for fulfilling the detection demands in different situations.

For achieving the aforementioned objectives, a multimode radar device in accordance with an embodiment of the present invention comprises:

a central processing module having a motion determination switch unit, the motion determination switch unit comprises a low distance resolution mode and a high distance resolution mode; and an antenna module disposed in a middle area of a rear end of a vehicle, the antenna module being electrically connected with the central processing module, the motion determination switch unit detecting a moving direction and status of the vehicle; when the vehicle is in a forwarding status, the antenna module operates in the low distance resolution mode; when the vehicle is in a reversing status, the antenna module operates in the high distance resolution mode.

With such configuration, when the present invention is applied to reverse radar detection (high distance resolution mode), the detection of railing, electric pole, or small obstacle will be detected with a more precise resolution, thereby preventing error or abnormal detection issues. When the present invention is applied for blind spot detection (low distance resolution mode), the obstacles to be detected are larger objects such as vehicles. Therefore, instead of precise resolution, a larger detection range is needed, which requires a farther radar refection detection ability for providing a sufficient time for driver reaction. Thus, the present invention serves as both the blind spot detector and a reverse radar with the antenna module which is applicable in the low distance resolution mode and the high distance resolution mode, thereby fulfilling different demands in different moving statuses of the vehicle.

Also, the present invention comprises a path prediction module electrically connected with the central processing module. The detection angle of the antenna module is smaller than 180 degrees, therefore it has at least one detection blind area. The path prediction module acquires the velocity and moving direction information of the approaching object through the reflection signal of the antenna module, so as to predict the moving path of the approaching object. Even when the object enters the detection blind area, the present invention still provides the warning function.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 2 to FIG. 8, the present invention provides a multimode radar device, comprising a central processing module 10 and an antenna module 20.

Figure 2:
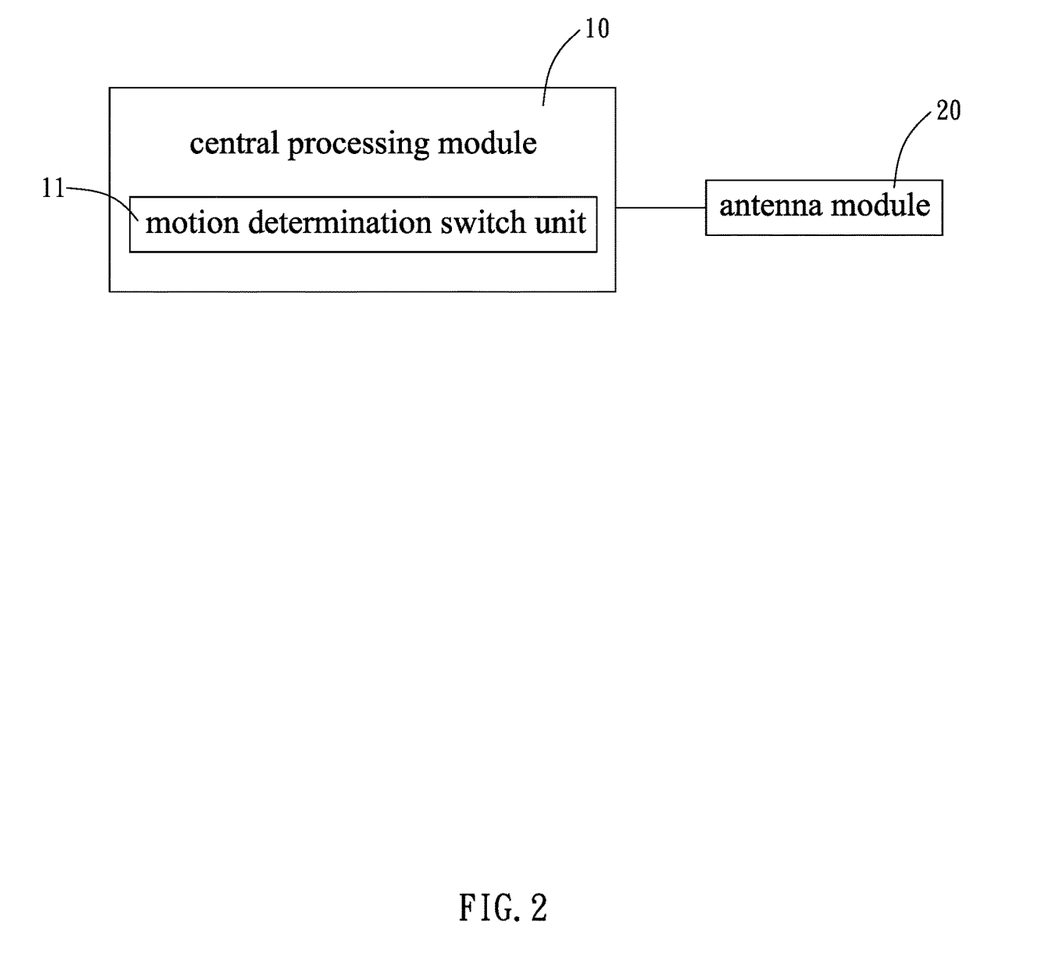
FIG. 2 is a first structural block diagram of the system in accordance with an embodiment of the present invention.

The central processing module 10 comprises a motion determination switch unit 11, which comprises a low distance resolution mode and a high distance resolution mode.

The antenna module 20 is disposed in a middle area of the rear end of a vehicle 100 and electrically connected with the central processing module 10. The motion determination switch unit 11 detects the moving direction status of the vehicle 100. When the vehicle 100 is moving forward, the antenna module 20 operates in the low distance resolution mode. When the vehicle 100 is reversing, the antenna 20 operates in the high distance resolution mode.

Regarding the motion determination switch unit 11, the distance resolution is an index for measuring the ability of the radar for identifying two targets. In other words, it is the smallest distance by which the two targets cannot be practically separated during detection. In the embodiment, the distance resolution of the low distance resolution mode ranges from 30 to 60 centimeters, and the distance resolution of the high distance resolution mode ranges from 5 to 30 centimeters. Also, in possible embodiment, the motion determination switch unit 11 changes the signal bandwidth entering the antenna module 20 to switch between the low and high distance resolution modes. For example, for an initial frequency of 77 GHz, when the signal bandwidth is 4 GHz, the distance resolution of the antenna module 20 is approximately 3.75 centimeters; when the signal bandwidth is 2 GHZ, the distance resolution of the antenna module 20 is approximately 7.5 centimeters; when the signal bandwidth is 1 GHZ, the distance resolution of the antenna module 20 is approximately 15 centimeters; when the signal bandwidth is 600 GHZ, the distance resolution of the antenna module 20 is approximately 25 centimeters. Therefore, the motion determination switch unit 11 of the present invention can accordingly change the low and high distance resolution modes of the antenna module 20 to realize different distance resolutions.

When the motion detection switch unit 11 of the present invention identifies that the vehicle 100 is moving forward, the motion determination switch unit 11 switches the antenna module 20 to operate in the low distance resolution mode, so as to apply the blind spot detection (BSD) for detecting vehicles or other objects approaching from the read side of the vehicle 100. When the motion determination switch unit 11 identifies that the vehicle 100 is reversing, the motion determination switch unit 11 switches the antenna module 20 to operate in the high distance resolution mode, so as to serve as a reverse radar for detecting the obstacles in the rear of the vehicle during the reversing of the vehicle 100. Accordingly, the motion determination switch unit 11 of the present invention automatically detects the moving direction of the vehicle, such that the antenna module 20 is automatically switched to operate in the low distance resolution mode or the high distance resolution mode. Thus, the single antenna module 20 has different modes for application in blind spot detection or providing a reverse radar detection function.

Based on the fact that the distance resolution of the low distance resolution mode ranges from 30 to 60 centimeters, and the distance resolution of the high distance resolution mode ranges from 5 to 30 centimeters, the detection of railing, electric pole, or small obstacle can be detected with a more precise resolution, thereby preventing error or abnormal detection issues. When the present invention is applied for blind spot detection (low distance resolution mode), the obstacles to be detected are larger objects such as other vehicles. Therefore, instead of precise resolution, a larger detection range is needed, which requires a farther radar refection detection ability for providing a sufficient time for driver reaction. Thus, the present invention serves as both the blind spot detector and a reverse radar with the antenna module 20 which is applicable in the low distance resolution mode and the high distance resolution mode, thereby fulfilling different demands in different moving statuses of the vehicle.

Figure 3:
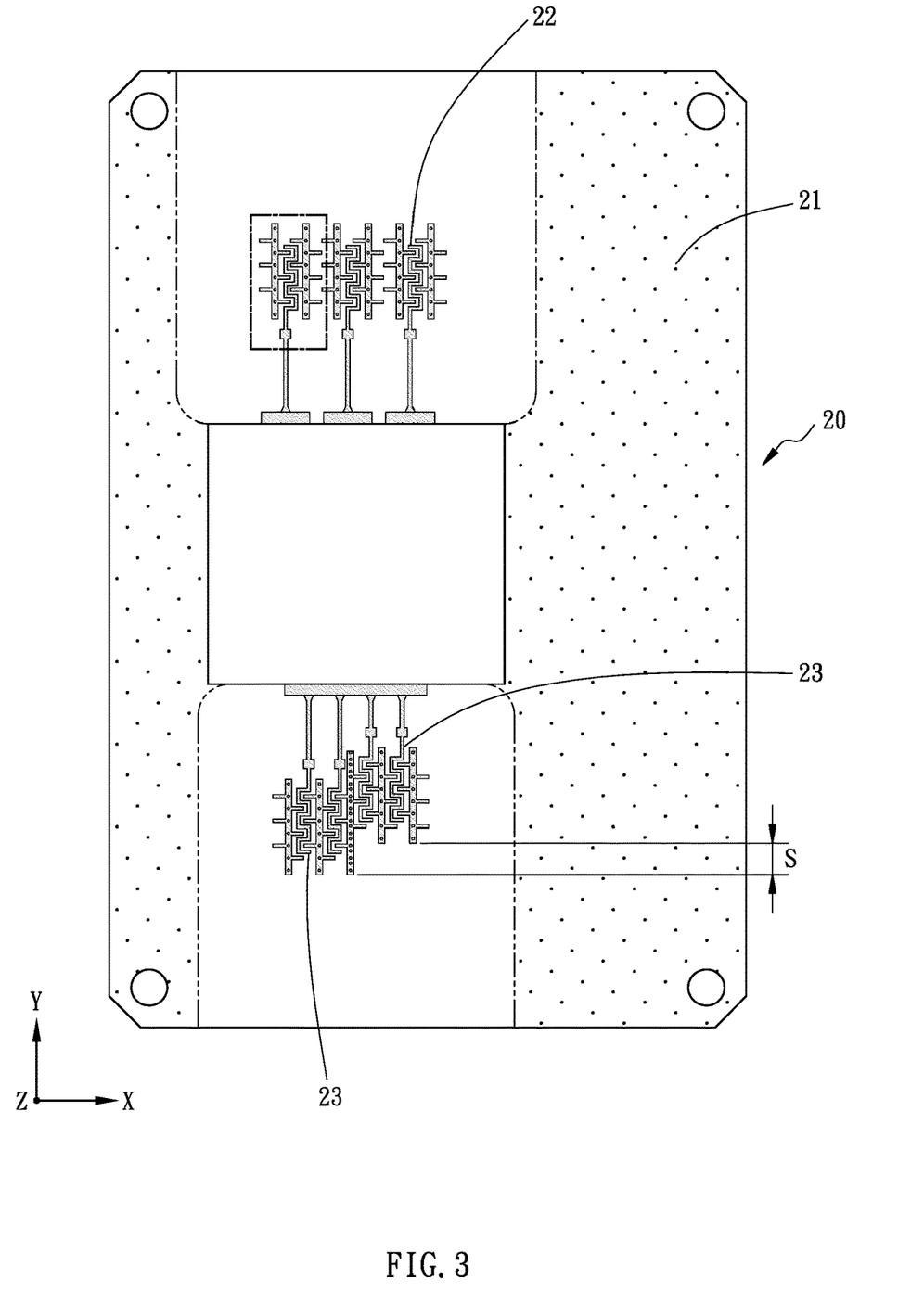
FIG. 3 is a schematic view illustrating the arrangement of the antenna member on the circuit board in accordance with an embodiment of the present invention.

Further, the half power beam width (HPBM) of the antenna module 20 on the H-plane ranges from 130 to 180 degrees substantially, and the half power beam width of the antenna module 20 on the E-plane ranges from 35 to 90 degrees substantially. Referring to FIG. 3, the antenna module 20 comprises a circuit board 21, at least one transmission antenna member 22, and at least one receiving antenna member 23, wherein the at least one transmission antenna member 22 and the at least one receiving antenna member 23 are disposed on the circuit board 21. Also, the circuit board 21 is formed in a flat plane shape, such that the at least one transmission antenna member 22 and the at least one receiving antenna member 23 are arranged on the same plane.

In the present invention, a certain location difference is produced between each transmission antenna member 22 or each receiving antenna member 23, such that the transmission antenna members 22 or the receiving antenna members 23 are not in alignment, thereby facilitating the vertical separability of the antenna module 20. For example, in a possible embodiment, a plurality of transmission antenna members 22 are arranged in parallel along a parallel direction and extending along a longitudinal direction which is perpendicular to the parallel direction, wherein at least one transmission antenna member 22 has a location difference to be not in alignment with other transmission antenna members 22.

In another possible embodiment, a plurality of receiving antenna members 23 are arranged in parallel along a parallel direction and extending along a longitudinal direction which is perpendicular to the parallel direction, wherein at least one receiving antenna member 23 has a location difference to be not in alignment with other receiving antenna members 23.

Figure 3A:
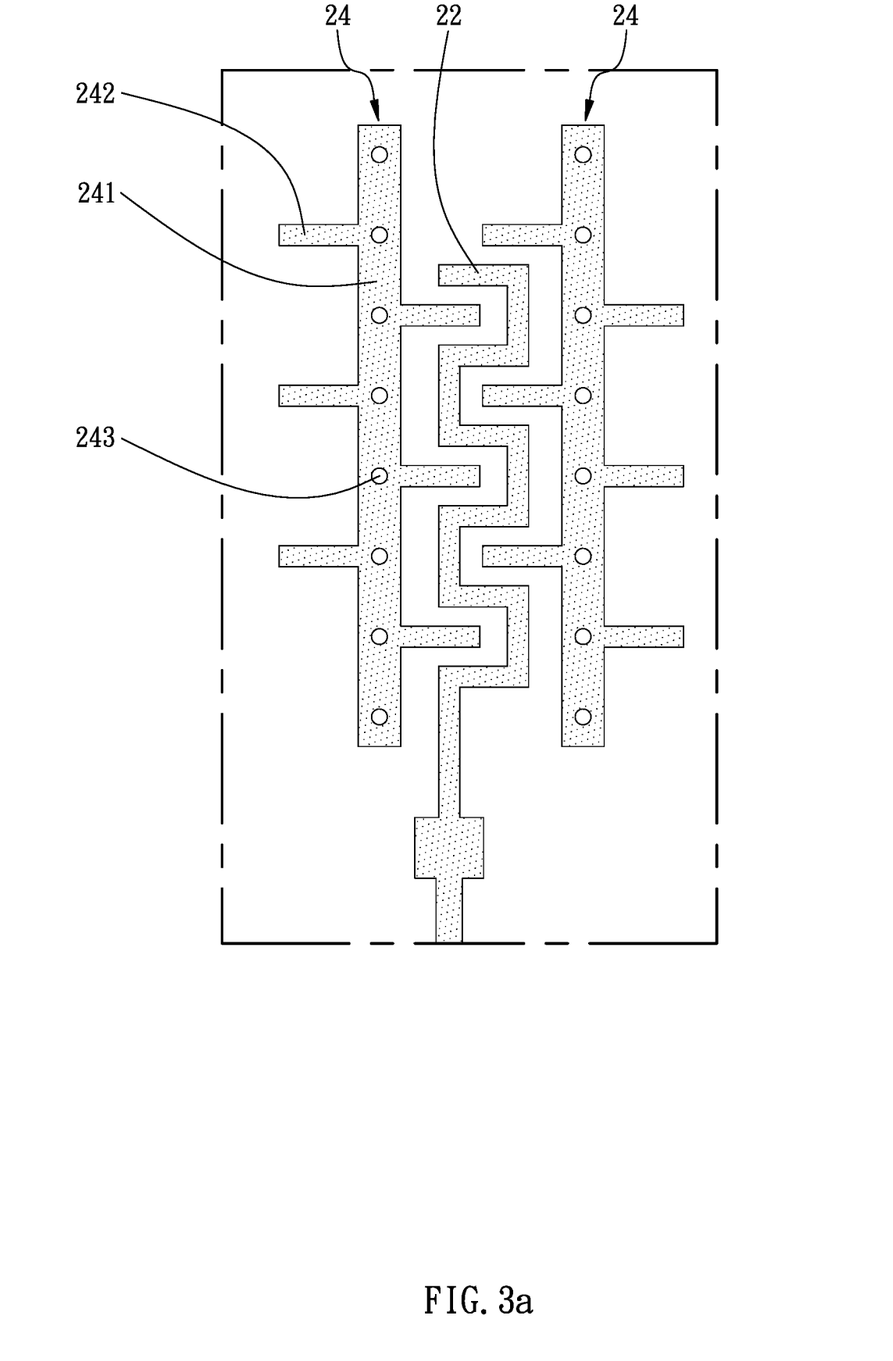
FIG. 3a is a partially enlarged schematic view of the antenna member in accordance with an embodiment of the present invention.
Figure 4:
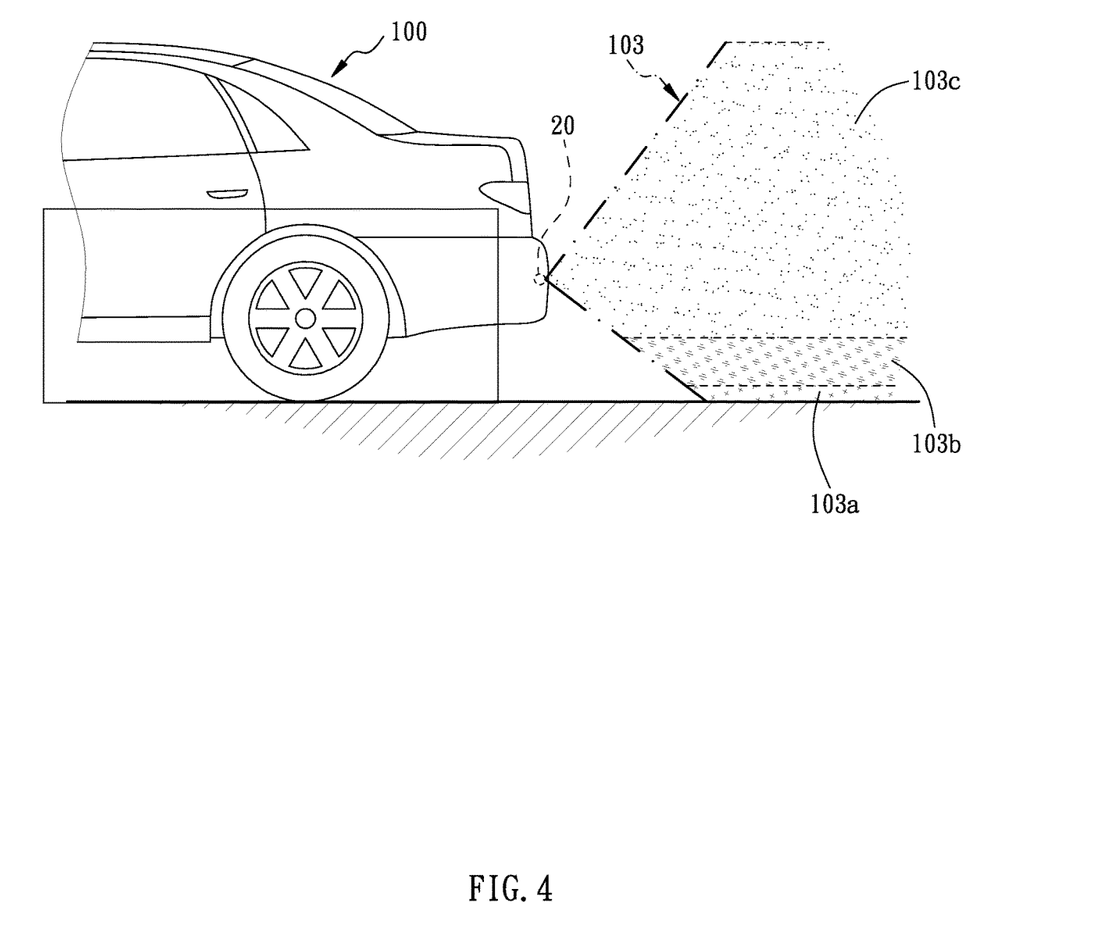
FIG. 4 is a schematic view illustrating the vertical reflection signal in accordance with an embodiment of the present invention.

Referring to FIG. 3 and FIG. 3a, in the embodiment, four receiving antenna members 23 are disposed on the circuit board 21. The plurality of receiving antennas are arranged along a parallel direction X and extending along a longitudinal direction Y, wherein the longitudinal direction Y is perpendicular to the parallel direction X. Also, the transmission antennas are arranged in parallel along the parallel direction X and also extending along the longitudinal direction Y. Therein, two neighboring receiving antenna members 23 are arranged relatively lowered than other two neighboring receiving antenna members 23 along the longitudinal direction Y by a location difference S. However, the location difference S in the present invention is not limited to a lower position; therefore, the location difference S can also be a higher position. Alternatively, the location difference S can also exist among the receiving antenna member 22. Either situation can produce the vertical separability for the detection of the antenna module 20. For further explanation, each transmission antenna member 22 and receiving antenna member 23 is formed in a zigzag shape, with a decoupling member 24 disposed on two sides of the transmission antenna member 22 and the receiving antenna member 23. The decoupling member 24 comprises a conduction portion 241 and a comb shaped suppression portion 242 formed of a laterally perpendicular extension of the conduction portion 241. The suppression portion 242 stretches into a concave area of the transmission antenna member 22 and the receiving antenna member 23. Also, the suppression portion 242 does not contact the transmission antenna member 22 and the receiving antenna member 23. Moreover, the decoupling member 24 comprises a plurality of vias 243 passing through the grounding ends (not shown) of the bottom layer of the circuit board 21. With the decoupling member 24, the sense current of the transmission antenna member 22 and the receiving antenna member 23 is effectively suppressed.

The blind spot detection and reversing radar detection shall have different reaction to the reflected vertical signal. For example, objects such as a metal manhole cover on the ground or a ditch cover will produce strong reflection signal. However, in blind spot detection and reversing radar detection, such objects will not cause any influence. As for higher level objects such as a flowerpot, stair, or animal like cat or dog, during blind spot detection, the reflection signals of those objects will be considered as objects passing near the vehicle which cause no effects on movement safety. However, during reversing radar detection, those reflection signals of flowerpot, stair, or animal like cat or dog may influence the vehicle safety and shall therefore be considered. Therefore, referring to FIG. 4, the central processing module 10 further comprises a vertical signal determination unit 12, which divides the reflection signal 103 received by the antenna module 20 in the vertical direction into a lower layer signal 103*a*, a middle layer signal 103*b*, and a higher layer signal 103*c*. Therein, in the high distance resolution mode, the antenna module 20 ignores the lower layer signal 103*a*. In the low distance resolution mode, the antenna module 20 ignores the lower layer signal 103*a* and the middle layer signal 103*b*. Furthermore, the lower layer signal 103*a* is the reflection signal from 0 to 10 centimeters above the ground surface, the middle layer signal 103*b* is the reflection signal from 10 to 30 centimeters above the ground surface, and the higher layer signal 103*c* is the reflection signal from 30 centimeters above the ground surface.

Figure 5:
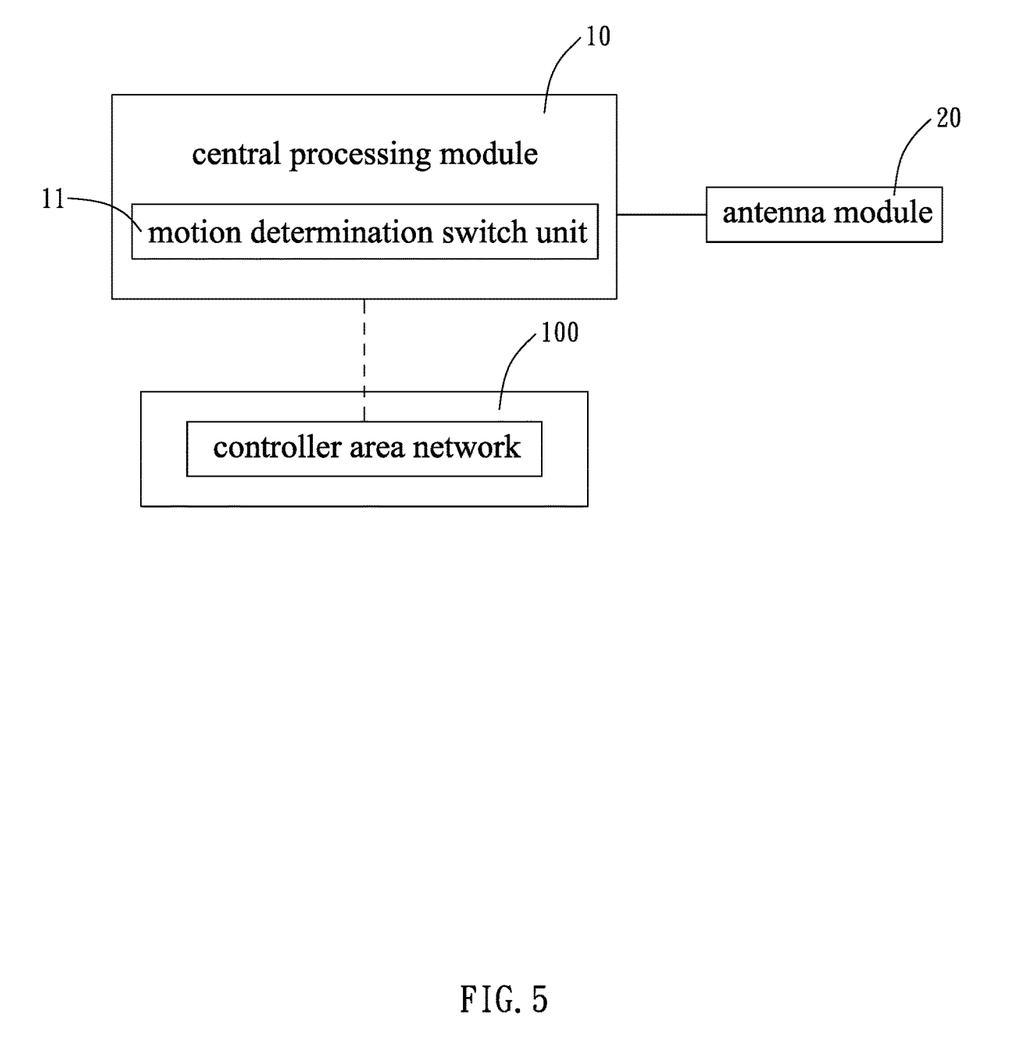
FIG. 5 is a second structural block diagram of the system in accordance with an embodiment of the present invention.

Referring to FIG. 5, in a possible embodiment, the central processing module 10 is electrically connected with a controller area network (CAN) for acquiring the gear signal of the vehicle 100, so as to detect the moving direction status of the vehicle 100.

Figure 6:
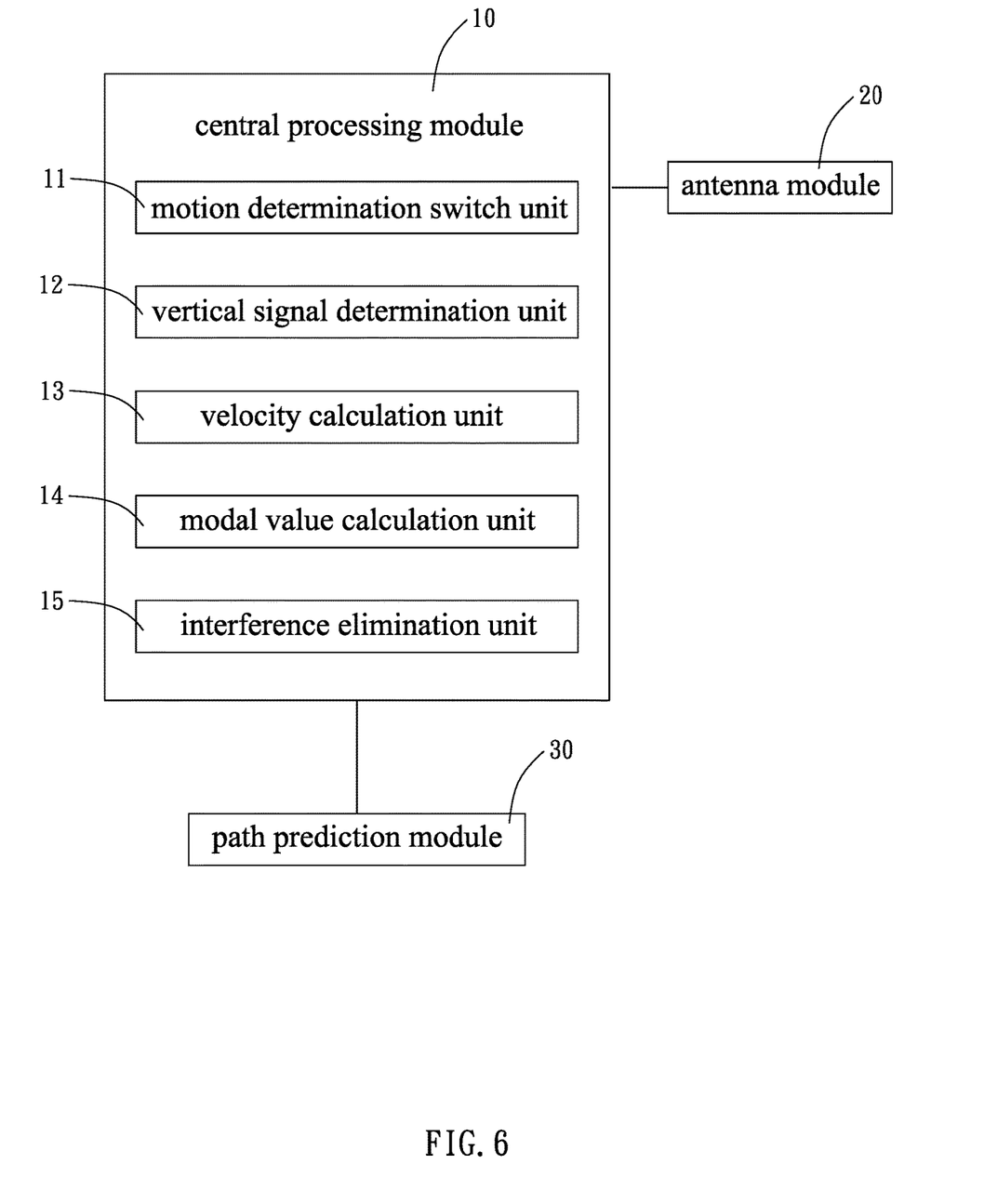
FIG. 6 is a third structural block diagram of the system in accordance with an embodiment of the present invention.
Figure 7:
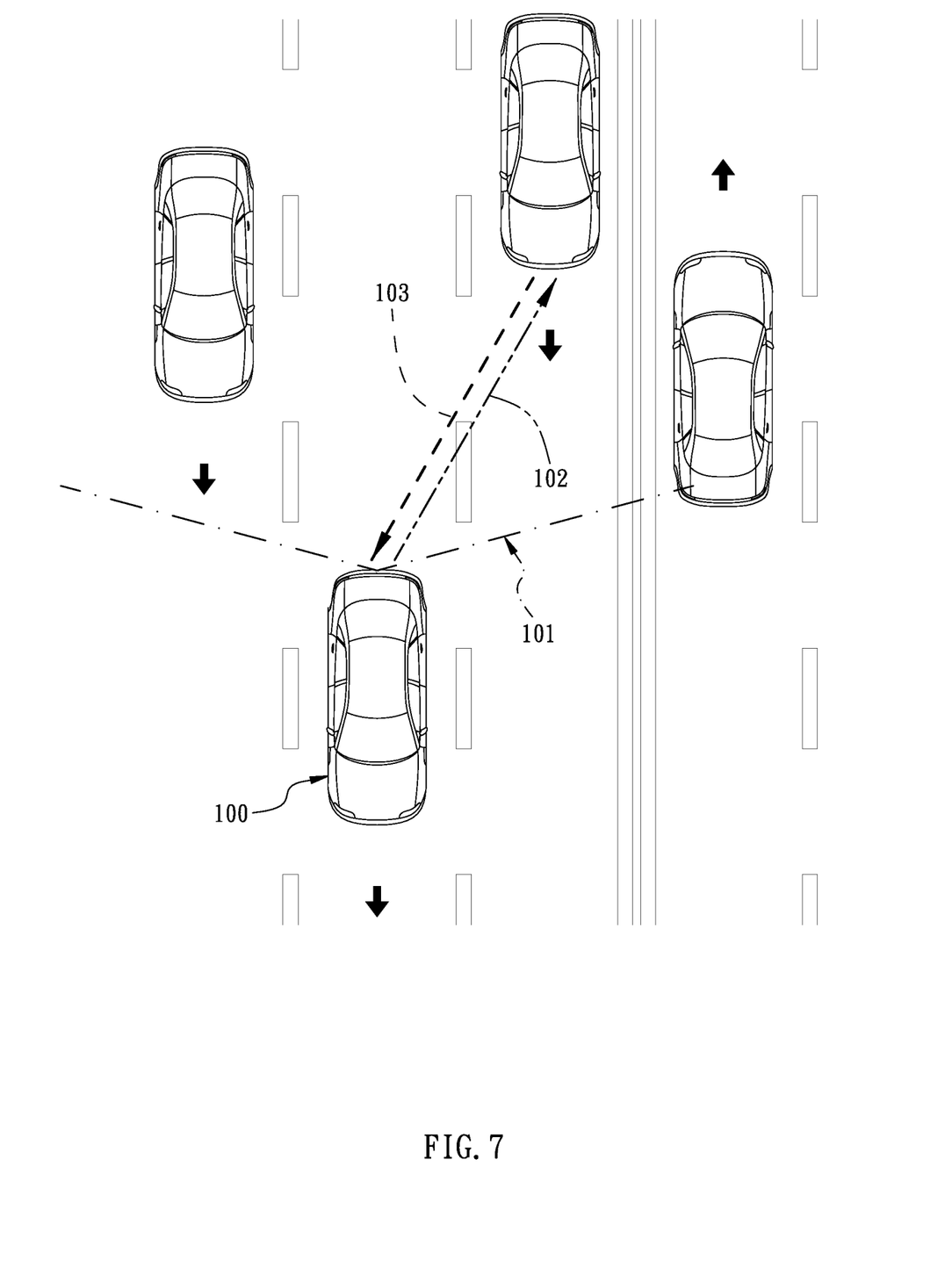
FIG. 7 is a schematic view illustrating the operation of the modal value calculation unit in accordance with an embodiment of the present invention.

In another possible embodiment, referring FIG. 6 and FIG. 7, the central processing module 10 comprises a velocity calculation unit 13. The antenna module 20 sends out a transmission signal 102 toward a detection area 101 in the rear of the vehicle 100, and acquires the reflection signal 103 reflected by the object in the detection area 101. The velocity calculation unit 13 calculates the relative velocity of the object in the detection area 101 with respect to the vehicle 100, so as to identify if the object is a static object or a moving object, and identify the moving direction and the velocity of the vehicle based on the relative moving direction and relative velocity of the vehicle and the static object, providing the determination base for the motion determination switch unit 11. Notably, the "speed" refers to the traveling route passed through by the object in a unit time, which does not include the direction thereof; the "velocity", which is different from the "speed", describes the physical quantity of the speed and direction of the object movement. In the embodiment, when the speed of the vehicle is higher than a threshold value, the motion determination switch unit 11 directly determines that the vehicle 100 is in a status of moving forward, so as to control the antenna module 20 to be switched to the low distance resolution mode. For further explanation, the threshold value can be set as 40 kilometers. Since a driver seldom reverses the vehicle 100 at 40 km/hour, the possible moving status of the vehicle 100 can be determined accordingly by referring to status of the reflection signal and the threshold value.

Also, referring to FIG. 7, the objects in the detection area 101 are mostly static objects such as the ground surface, divisional island or railings, and other moving objects (such as those approaching or leaving the vehicle 100) just account for a small portion. Therefore, most of the reflection signals having the same velocity detected by the antenna module 20 can be determined as static objects, and other reflection signals 103 having different velocity are determined as moving objects. Accordingly, the central processing module 10 comprises a modal value calculation unit 14. By cooperating the modal value calculation unit 14 and the velocity calculation unit 13, the modal value calculation unit 14 determines the objects having the same velocity in the most amount in the detection area 101 as static objects.

Furthermore, when in a traffic jam or when the vehicle velocity is slower, other vehicles in the rear may be too close to the vehicle 100, so that most of the reflection signals 103 in the detection area 101 of the antenna module 20 are reflected by a target vehicle in the rear of the vehicle 100, causing an error of determination. However, because the wheels in movement are revolving fast, so that the reflection signal produced by the wheels can be received by the radar for identification. Therefore, the reflection signals 103 of a target vehicle having the wheels signal features or the reflection signals 103 from above the wheels can be screened and excluded first, so as to ensure the correctness of the speed calculation result of the modal value calculation unit 14. Thus, the central processing module 10 further comprises an interference elimination unit 15, which excludes the reflection signal 103 thereof having a wheel reflection feature. When the vehicle speed is lower than the threshold value, the interference elimination unit 15 preferentially detects and excludes the reflection signal 103 having the wheel reflection feature first, and the velocity calculation unit 13 subsequently identifies the moving direction of the vehicle 100, based on which the motion determination switch unit 11 carries out the determination process and controls the antenna module 20 to be switched to the low distance resolution mode or the high distance resolution mode.

Figure 8:
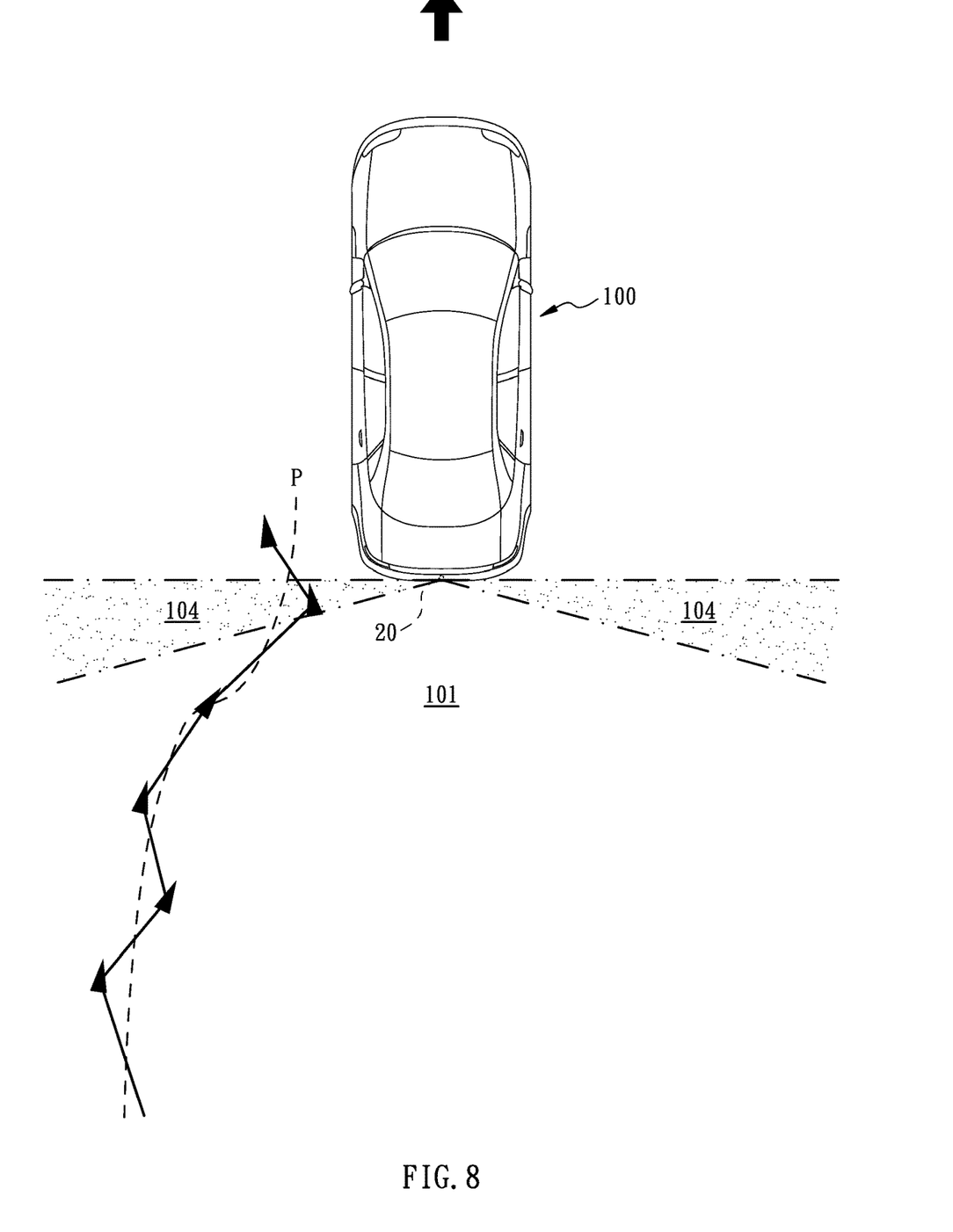
FIG. 8 is a schematic view illustrating the operation of the path prediction module in accordance with an embodiment of the present invention.

In a possible embodiment, the present invention further comprises a path prediction module 30 electrically connected with the central processing module 10. Referring to FIG. 8, because the detection angle of the antenna module 20 is smaller than 180 degrees, at least a detection blind area 104 exists on the left and the right side of the antenna module 20. The path prediction module 30 acquires the velocity and direction information of the approaching object according to the reflection signal of the antenna module 20, thereby predicting the moving path P of the approaching object. When the path prediction module 30 calculates that the approaching object entering the detection blind area 104, the warning can still be provided until the approaching object leaves the detection blind area 104. Therefore, erroneous judgement of the driver due to the blind area of the antenna module 20 is effectively prevented.

Figure 9:
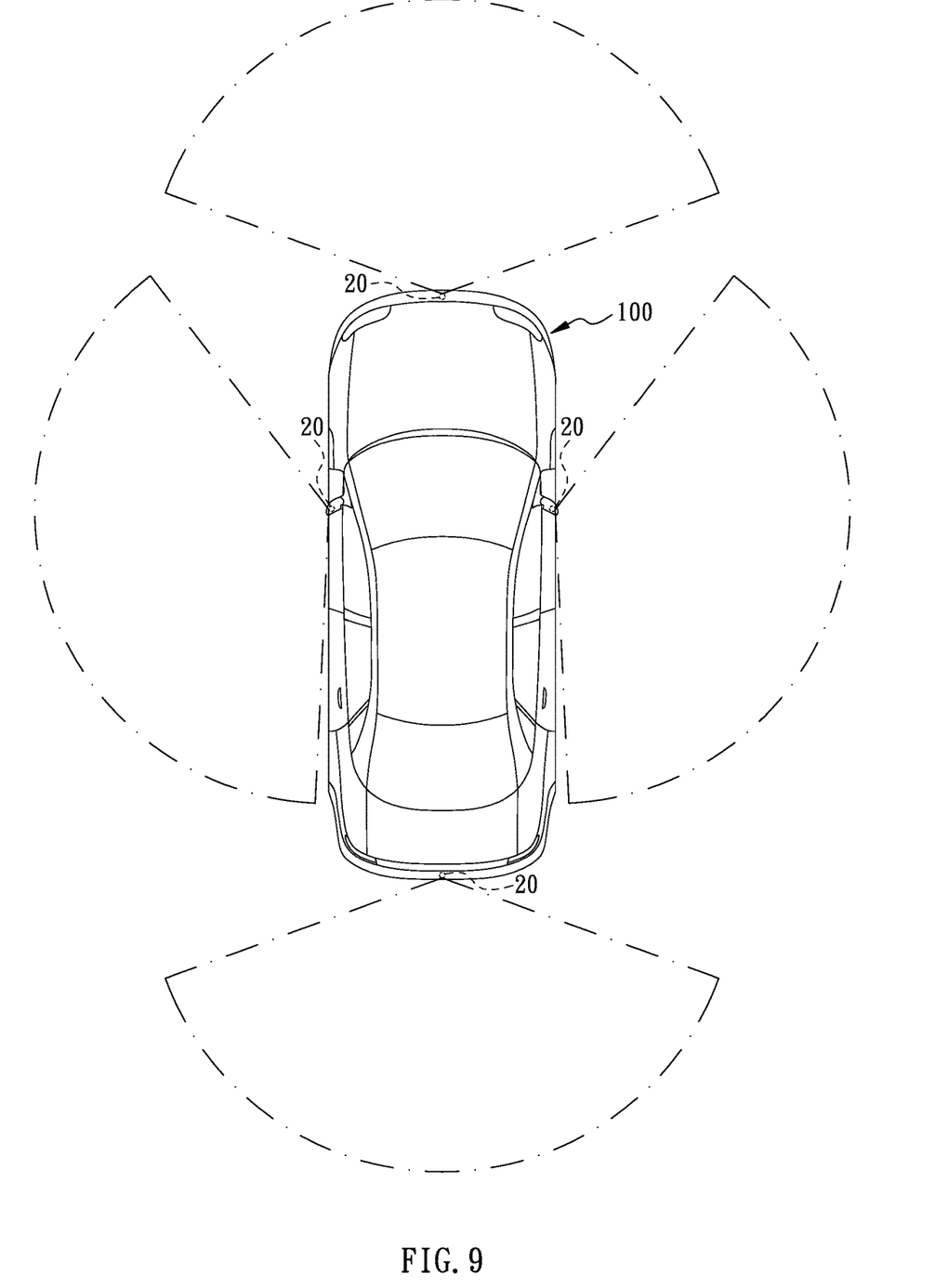
FIG. 9 is a schematic view illustrating the operation in accordance with another embodiment of the present invention.

Referring to FIG. 9, another embodiment of the present invention is provided, comprising at least one antenna module 20 electrically connected with the central processing module 10. The at least one antenna module 20 is disposed on an appropriate location of the shell body of the vehicle 100, so as to carry out the detection toward different directions such as the front side, lateral side or rear side of the vehicle 100. The motion determination switch unit 11 of the central processing module 10 is able to detect the moving direction status of the vehicle 100. When the moving velocity (including moving forward or reversing status) of the vehicle 100 is higher than a predetermined threshold value, such as 20 km/hour, the vehicle 100 is determined as moving forward fast, and the antenna module 20 operates in the low distance resolution. When the moving velocity (including moving forward or reversing status) of the vehicle 100 is lower than a predetermined threshold value, the vehicle 100 is determined as being in a parking, parking lot searching, reversing, or temporarily parking status, wherein the more specific resolution is needed for detecting smaller obstacle, so that the antenna module 20 operates in the high distance resolution mode.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A multimode radar device, comprising:
a central processing module having a motion determination switch unit, the motion determination switch unit comprising a low distance resolution mode and a high distance resolution mode; and
an antenna module disposed in a middle area of a rear end of a vehicle and electrically connected with the central process module, the motion determination switch unit configured to detect a moving direction status of the vehicle; when the vehicle is in a moving forward status, the antenna module operates in the low distance resolution mode; when the vehicle is in a reversing status, the antenna module operates in the high distance resolution mode,
wherein the central processing module further comprises a vertical signal determination unit, which divides a reflection signal received by the antenna module in a vertical direction into a lower layer signal, a middle layer signal, and a higher layer signal, and
wherein in the high distance resolution mode, the antenna module ignores the lower layer signal, and in the low distance resolution mode, the antenna module ignores the lower layer signal and the middle layer signal.

2. The multimode radar device of claim 1, wherein a distance resolution of the low distance resolution mode ranges from 30 to 60 centimeters, and a distance resolution of the high distance resolution mode ranges from 5 to 30 centimeters.

3. The multimode radar device of claim 1, wherein a half power beam width (HPBM) of the antenna module on an H-plane ranges from 130 to 180 degrees substantially.

4. The multimode radar device of claim 1, wherein a half power beam width of the antenna module on an E-plane ranges from 35 to 90 degrees substantially.

5. The multimode radar device of claim 1, wherein the lower layer signal is the reflection signal from 0 to 10 centimeters above a ground surface, the middle layer signal is the reflection signal from 10 to 30 centimeters above the ground surface, and the higher layer signal is the reflection signal from 30 centimeters above the ground surface.

6. The multimode radar device of claim 1, wherein the central processing module is electrically connected with a controller area network for acquiring a gear signal of the vehicle, so as to detect the moving direction status of the vehicle.

7. The multimode radar device of claim 1, wherein the central processing module comprises a velocity calculation unit; the antenna module sends out a transmission signal toward a detection area in rear of the vehicle and acquires the reflection signal reflected by an object in the detection area; the velocity calculation unit calculates a relative velocity of the object in the detection area with respect to the vehicle, so as to identify if the object is a static object or a moving object, and identify a moving direction and a speed of the vehicle based on a relative moving direction and the relative velocity of the vehicle and the static object, providing a determination base for the motion determination switch unit.

8. The multimode radar device of claim 7, wherein the central processing module comprises a modal value calculation unit electrically connected with the velocity calculation unit; the modal value calculation unit determines the object having a same velocity in a most amount in the detection area as the static object.

9. The multimode radar device of claim 7, wherein when the vehicle speed is higher than a threshold value, the motion determination switch unit directly determines that the vehicle is in the moving forward status, so as to control the antenna module to be switched to the low distance resolution mode.

10. The multimode radar device of claim 7, wherein the central processing module further comprises an interference elimination unit, which excludes the reflection signal having a wheel reflection feature; when the vehicle speed is lower than the threshold value, the interference elimination unit detects and excludes the reflection signal having the wheel reflection feature first, and the velocity calculation unit subsequently identifies the moving direction of the vehicle, based on which the motion determination switch unit carries out a determination process and controls the antenna module to be switched to the low distance resolution mode or the high distance resolution mode.

11. The multimode radar device of claim 1, further comprising a path prediction module electrically connected with the central processing module; the detection angle of the antenna module is smaller than 180 degrees, therefore it has at least one detection blind area; the path prediction module acquires a velocity and direction information of an approaching object according to a reflection signal of the antenna module, thereby predicting a moving path of the approaching object.

12. The multimode radar device of claim 1, wherein the antenna module comprises a circuit board, at least one transmission antenna member, and at least one receiving antenna member; the at least one transmission antenna member and the at least one receiving antenna member are disposed on the circuit board.

13. The multimode radar device of claim 12, wherein the circuit board is formed in a flat plane shape, such that the at least one transmission antenna member and the at least one receiving antenna member are arranged on a same plane.

14. The multimode radar device of claim 12, wherein a plurality of transmission antenna members are arranged in parallel along a parallel direction and extending along a longitudinal direction which is perpendicular to the parallel direction, wherein at least one of the transmission antenna members has a location difference to be not in alignment with other transmission antenna members.

15. The multimode radar device of claim 12, wherein a plurality of receiving antenna members are arranged in parallel along a parallel direction, and extending along a longitudinal direction which is perpendicular to the parallel direction, wherein at least one of the receiving antenna members has a location difference to be not in alignment with other receiving antenna members.

* * * * *